United States Patent
Dupont de Dinechin

(10) Patent No.: US 11,604,646 B2
(45) Date of Patent: Mar. 14, 2023

(54) PROCESSOR COMPRISING A DOUBLE MULTIPLICATION AND DOUBLE ADDITION OPERATOR ACTUABLE BY AN INSTRUCTION WITH THREE OPERAND REFERENCES

(71) Applicant: Kalray, Montbonnot Saint Martin (FR)

(72) Inventor: Benoit Dupont de Dinechin, Grenoble (FR)

(73) Assignee: Kalray, Montbonnot Saint Martin (FR)

( * ) Notice: Subject to any disclaimer, the term of this patent is extended or adjusted under 35 U.S.C. 154(b) by 0 days.

(21) Appl. No.: 17/565,120

(22) Filed: Dec. 29, 2021

(65) Prior Publication Data

US 2022/0222073 A1     Jul. 14, 2022

(30) Foreign Application Priority Data

Dec. 29, 2020  (FR) ...................................... 2014208

(51) Int. Cl.
*G06F 9/30*    (2018.01)
(52) U.S. Cl.
CPC .......... *G06F 9/3001* (2013.01); *G06F 9/3013* (2013.01); *G06F 9/30101* (2013.01)
(58) Field of Classification Search
None
See application file for complete search history.

(56) References Cited

U.S. PATENT DOCUMENTS

| | | | | |
|---|---|---|---|---|
| 6,523,055 B1* | 2/2003 | Yu | ......................... | G06F 7/5443 |
| | | | | 708/620 |
| 7,062,526 B1* | 6/2006 | Hoyle | ................. | G06F 9/30014 |
| | | | | 708/550 |
| 8,386,550 B1* | 2/2013 | Mauer | .................... | H03H 17/06 |
| | | | | 708/319 |
| 8,645,451 B2* | 2/2014 | Langhammer | ........ | G06F 7/5324 |
| | | | | 708/620 |
| 9,069,624 B1* | 6/2015 | Langhammer | ........ | G06F 7/5324 |
| 9,600,235 B2* | 3/2017 | Iyer | ......................... | G06F 7/525 |
| 2008/0256162 A1 | 10/2008 | Henry et al. | | |

(Continued)

OTHER PUBLICATIONS

Vestias, M. et al., Parallel Dot-Products for Deep Learning on FPGA, 2017, IEEE, 2017 intl. Conf. on Field Logic and Applications, 4 pages. (Year: 2017).*

*Primary Examiner* — Eric Coleman

(57) ABSTRACT

A method of processing data by a processor, the method comprising the steps of: receiving, by the processor, an instruction including an operator code associated with three register references designating registers configured to contain pairs of multiplication operands, an addition operand, and a result register configured to receive an operator result, the operator code designating an operator configured to compute products of the pairs of multiplication operands and add the products with the addition operand; decoding the instruction by an instruction decoder of the processor, to determine the operator to be executed, and the registers containing the operands to be supplied to the operator and the result of the operator; actuating the operator by an arithmetic circuit of the processor, consuming the operands in the registers designated by the register references; and storing the result of the operator in the designated result register.

16 Claims, 3 Drawing Sheets

(56) References Cited

U.S. PATENT DOCUMENTS

| | | | |
|---|---|---|---|
| 2010/0121898 A1* | 5/2010 | Swartzlander, Jr. | .... G06F 17/16 |
| | | | 708/501 |
| 2011/0153707 A1 | 6/2011 | Ginzburg et al. | |
| 2018/0321938 A1 | 11/2018 | Boswell et al. | |
| 2019/0042260 A1 | 2/2019 | Ould-Ahmed-Vall et al. | |

* cited by examiner

PROCESSOR COMPRISING A DOUBLE MULTIPLICATION AND DOUBLE ADDITION OPERATOR ACTUABLE BY AN INSTRUCTION WITH THREE OPERAND REFERENCES

CROSS-REFERENCE TO RELATED APPLICATION

This application is based on and claims priority under 35 U.S.C. § 119 to French Patent Application No. 20 14208 filed on Dec. 29, 2020, the disclosure of which is herein incorporated by reference in its entirety.

BACKGROUND

The present disclosure relates to the implementation of number-processing hardware operators of a processor core, and in particular operators combining several numbers by multiplication and addition operations. The manipulated numbers may be encoded in different formats such as fixed- or floating-point, single or double precision, integers and Galois field element representations. Combined operations may include, for example, polynomial evaluation operations, complex arithmetic operations, and matrix or vector multiplication operations.

Many applications involve sums of products of numbers. This is the case, for example, for matrix multiplications or transcendental functions such as trigonometric functions and logarithmic functions, which are approximated by polynomials. Artificial intelligence technologies, such as deep learning, use matrix multiplications that may have several hundred rows and columns and the calculation of linear combinations.

In main general-purpose processor cores, the sums of products of numbers are performed by relying on a hardware operator that performs a fused multiply and add (FMA). Specifically, this operator performs the a·b+c operation with three operands a, b, c, which may be floating-point, by first calculating the product of operands a and b, and then adding the product to operand c. The result of the addition is rounded to a number that can be represented in a floating-point format. This number may be stored in a register for the purpose of using the result as the addition operand of a new FMA operation.

Typically, instructions in a processor core instruction set accept no more than three explicit operands, in the form of processor core register identifiers, namely two source register identifiers containing the values of the operands, and a destination register identifier intended to receive the result of the operation.

For performance reasons, it is desirable to implement a processor core with a hardware operator that combines multiple multiplications and additions, and to add an instruction to the instruction set of the processor core to activate this hardware operator.

It is therefore desirable to provide a processor core instruction set comprising an instruction that can combine more than three operands, without using more than three register identifiers, in order to evaluate, for example, a polynomial, a multiplication of complex numbers or a multiplication of matrices, using a minimum number of instructions.

SUMMARY

Embodiments relate to a method of processing data by a processor, the method comprising the steps of: receiving, by the processor, an instruction including an operator code associated with three register references designating registers configured to contain pairs of multiplication operands, an addition operand, and a result register configured to receive an operator result, the operator code designating an operator configured to compute products of the pairs of multiplication operands and add the products with the addition operand; decoding the instruction by an instruction decoder of the processor, to determine the operator to be executed, and the registers containing the operands to be supplied to the operator and the result of the operator; actuating the operator by an arithmetic circuit of the processor, consuming the operands in the registers designated by the register references; and storing the result of the operator in the designated result register.

According to an embodiment, the register references include two register references respectively designating: two pairs of consecutive registers of a register bank, configured to contain the multiplication operands, or two groups of N consecutive registers of the register bank, configured to contain the multiplication operands, wherein the operator is configured to calculate N products from N pairs of registers by associating a register of one of the two groups with a respective register of the other of the two groups.

According to an embodiment, the register references include: a register reference designating a same register configured to contain the addition operand and to receive the result provided by the operator, or a register reference designating two consecutive registers of the register bank, configured respectively to contain the addition operand and to receive the result provided by the operator, or a register reference designating a register configured to contain the addition operand, and a register reference designating a register configured to receive the result provided by the operator.

According to an embodiment, the products are calculated simultaneously, and the additions are performed simultaneously.

According to an embodiment, the register references designate multiple sets of operands, and each designated register includes one operand of each set of operands, the operator being executed on each set of operands simultaneously, the designated result register containing the results of the operator consuming the sets of operands.

According to an embodiment, the method comprises the steps of: receiving by the processor a series of instructions for evaluating a polynomial, wherein instructions of the series of instructions designate the operator and five operands, each instruction being configured to evaluate two terms involving a variable of a second degree polynomial, resulting from a decomposition of the polynomial to be evaluated, and calculating the sum of the two terms with a third term of the second degree polynomial; designating the result register of an instruction of the series of instructions in a subsequent instruction of the series of instructions as a product operand register to be multiplied by the square of the variable, and successively executing by the processor the instructions of the series of instructions to calculate a value of the polynomial to be evaluated involving the variable.

According to an embodiment, the polynomial to be evaluated is previously decomposed into two polynomials grouping the terms containing the variable raised to an even power and, respectively, the terms containing the variable raised to an odd power, the series of instructions including two series of instructions for evaluating the two polynomials respectively.

According to an embodiment, the method comprises the steps of: receiving by the processor a series of instructions for evaluating a dot-product of two vectors, the series of instructions including instructions designating the operator configured to each compute two terms of the product and add them to a result obtained by executing a preceding instruction of the series of instructions designating the operator, and executing successively by the processor the instructions of the series of instructions.

According to an embodiment, the instruction includes a parameter selectively indicating that the sign of each of the products is to be inverted before calculating the sum.

According to an embodiment, the instruction includes a parameter selectively indicating that the registers designated by one of the register references designating multiplication operands are to be swapped by pairs prior to calculation of the products.

According to an embodiment, the method comprises the steps of: receiving by the processor a series of instructions for evaluating the product of two complex numbers, the series of instructions including two instructions designating the operator and register pairs containing the real and imaginary parts of the two complex numbers, respectively, one of the two instructions being configured to compute a real part of the product and the other of the two instructions being configured to compute an imaginary part of the product, and executing by the processor the instructions of the series of instructions.

According to an embodiment, the operands are encoded in one of the following formats: single or double precision floating point, fixed point, integer, and number belonging to a Galois field.

According to an embodiment, the arithmetic calculation circuit of the processor is configured to calculate the products and the sum without loss of accuracy through rounding operations.

Embodiments may also relate to a processor configured to implement the previously defined method.

According to an embodiment, the processor comprises a plurality of processing units for actuating in parallel a plurality of operators computing the products and adding the products with the addition operand.

According to an embodiment, the processor comprises an operator including a plurality of multipliers, each calculating a product of pairs of operands, and an adder adding together the products to an addition operand.

BRIEF DESCRIPTION OF THE DRAWINGS

Examples of embodiments of the disclosure will be described in the following, in relation to the attached figures among which.

DETAILED DESCRIPTION

The present disclosure provides a processor core having in its instruction set an instruction for actuating an FDMDA operator combining two multiplications and two additions, to perform the operation a1·b1+a2·b2+c. This operator performs the equivalent of two FMA operations. In an embodiment, the FDMDA operator is combined with three register references to specify the five operands of the operator and to designate the register receiving the result of the operation.

Figure 1:
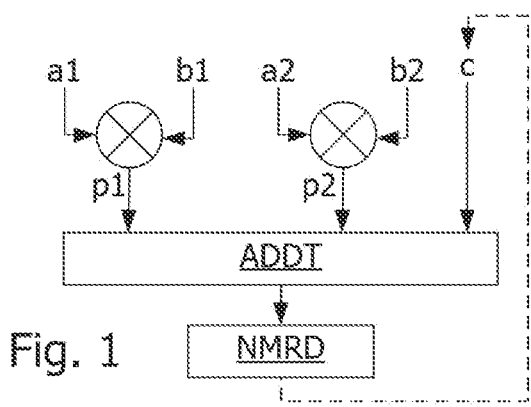
FIG. 1 is a schematic diagram of a double multiplication and double addition operator.

FIG. 1 shows a fused multiplication and addition operator FDMDA. The operator is associated with two pairs of multiplication operands, or multiplicands (a1, b1) and (a2, b2), and an addition operand c. The pairs of multiplicands (a1, b1) and (a2, b2) are provided to respective multipliers. The two resulting products p1, p2, called "partial products", and the addition operand c are added simultaneously by an adder tree ADDT. The multiplicands and the addition operator may be in floating-point format, of the same or different precision, or in different formats such as fixed point or integer. The result of the addition is processed by a normalization and rounding circuit NMRD to be converted to the original floating-point format, so that it can be reused as the addition operand c.

According to an embodiment, one register reference of the FDMDA operator designates a register containing the value of the operand c and to be used to provide the result of the operation.

According to another embodiment, the two pairs of operands (a1, b1) and (a2, b2) are designated by two register references each designating two consecutive registers of a register bank.

According to an exemplary embodiment, the processor core instruction set comprises an instruction FFDMDAW designating the FDMDA operator and associated with register references as follows:

$$FFDMDAW\ \$r_x=\$r_y,r_{y+1},\$r_z,r_{z+1},\ \text{or}$$

$$FFDMDAW\ \$r_x=\$r_y,\$r_z.$$

In this representation, "$rx" designates a register rx containing operand c, intended to receive the result of the operation, and "$ryry+1, $rzrz+1" or "$ry, $rz" designates two pairs of consecutive registers (ry, ry+1) and (rz, rz+1) in a register bank. Thus, each of the designated pairs of consecutive registers contains two operands. This instruction performs the operation: rx=rx+ry·rz+ry+1·rz+1.

According to an embodiment, the FFDMDAW operator may be applied to floating point numbers in single or double precision format, to fixed point numbers, to integers, or to a representation of numbers belonging to a Galois field.

According to an embodiment, to evaluate a polynomial Pn of degree n generally formulated as:

$$P_n(x) = \sum_{i=0}^{n} a_i x^i \qquad (1)$$

the polynomial $P_n$ is decomposed into nested polynomials of degree 2, in the following form:

$$P_n(x)=x^2 Q_{n-2}(x)+a_1 x+a_0, \text{ when } n \text{ is even, and} \qquad (2)$$

$$P_n(x)=x Q_{n-1}(x)+a_0, \text{ when } n \text{ is odd}, \qquad (3)$$

with $Q_j(x)=x^2 Q_{j-2}(x)+a_{n-j+1}x+a_{n-j}$, and j=2, 4, 6, ... n−2 when n is even (or 2, 4, 6, ... n−1 when n is odd). For example, a polynomial of degree 6 (n=6) can be presented in the following form:

$$P6(x)=((a6x2+a5x+a4)x2+a3x+a2)x2+a1x+a0$$

A polynomial of degree 7 (n=7) can be presented in the following form:

$$P7(x)=(((a7x2+a6x+a5)x2+a4x+a3)x2+a2x+a1)x+a0$$

The evaluation of the polynomial P6(x) can be performed, for example, by the following sequence of instructions:

| | |
|---|---|
| LW $r8 = x | # load x into register r8 |
| FMULW $r9 = $r8, $r8 | # calculate $x^2$ in register r9 |
| LW $r7 = $a_6$ | # load $a_6$ into register r7 |
| LW $r6 = $a_5$ | # load $a_5$ into register r6 |
| LW $r5 = $a_4$ | # load $a_4$ into register r5 |
| LW $r4 = $a_3$ | # load $a_3$ into register r4 |
| LW $r3 = $a_2$ | # load $a_2$ into register r3 |
| LW $r2 = $a_1$ | # load $a_1$ into register r2 |
| LW $r1 = $a_0$ | # load $a_0$ into register r1 |
| FFDMDAW $r5 = $r6r7, $r8r9 | # calculate r5 = $Q_2(x) = a_6 x^2 + a_5 x + a_4$ |
| FFDMDAW $r3 = $r4r5, $r8r9 | # calculate r3 = $Q_4(x) = x^2 Q_2(x) a_3 x + a_2$ |
| FFDMDAW $r1 = $r2r3, $r8r9 | # calculate r1 = $P_6(x) = x^2 Q_4(x) a_1 x + a_0$ |

The text after the "#" character is an explanatory comment on the previous instruction.

It can be observed that the polynomial P6(x) may be evaluated by only three successive FFDMDAW instructions, and without having to perform intermediate result transfers to another register. In general, a polynomial of degree n can be evaluated by n/2 FFDMDAW instructions if n is even, and (n+1)/2 FFDMDAW instructions if n is odd.

According to another embodiment, the polynomial $P_n$ is decomposed into two polynomials, $P_{2k}$ and $P_{2k+1}$ or $P_{2k-1}$, such that $P_n(x)=P_{2k}(x)+x \cdot P_{2k-1}(x)$ when n is even (n=2k), and $P_n(x)=x \cdot P_{2k+1}(x^2)+P_{2k}(x^2)$ when n is odd (n=2k+1). By positing $X=x^2$, the polynomials $P_{2k}$ and $P_{2k+1}$ are of the following form:

$$P_{2k}(X) = \sum_{i=0}^{2k} a_{2i} X^i \text{ and } P_{2k+1}(X) = \sum_{i=0}^{2k} a_{2i+1} X^i. \qquad (4)$$

Two independent polynomials are thus dealt with, to which the decomposition defined by equations (2) and (3) can be applied in an independent way. If the processor core allows it, especially in the case of a SIMD ("Single Instruction, Multiple Data") processor core, the two polynomials $P_{2k}(X)$ and $P_{2k-1}(X)$ (or $P_{2k+1}(X)$) can be evaluated in parallel.

The FFDMDAW instruction may also be used to calculate a matrix product or a dot-product with one or more operations of the type:

$$V_1 V_2 = \sum_{i=0}^{n} a_i \cdot b_i \qquad (5)$$

where $V_1$ is a vector of components $(a_0, a_1, a_2, \ldots, a_n)$ and $V_2$ is a vector of components $(b_0, b_1, b_2, \ldots, b_n)$. According to an embodiment, the dot-product of the vectors V1, V2 may be performed by the following instruction sequence:

| | |
|---|---|
| LW $r1 = 0 | # initialize register r1 |
| LW $r2 = $a_0$ | # load $a_0$ into register r2 |
| LW $r3 = $a_1$ | # load $a_1$ into register r3 |
| LW $r8 = $b_0$ | # load $b_0$ into register r8 |
| LW $r9 = $b_1$ | # load $b_1$ into register r9 |
| FFDMDAW $r1 = $r2r3, $r8r9 | # calculate r1 = r1 + $a_0 \cdot b_0 + a_1 \cdot b_1$ |
| LW $r2 = $a_2$ | # load $a_2$ into register r2 |
| LW $r3 = $a_3$ | # load $a_3$ into register r3 |
| LW $r8 = $b_2$ | # load $b_2$ into register r8 |
| LW $r9 = $b_3$ | # load $b_3$ into register r9 |
| FFDMDAW $r1 = $r2r3, $r8r9 | # calculate r1 = r1 + a2 · $b_2$ + $a_3$ · $b_3$ |
| ... | |

Thus, each FFDMDAW instruction above calculates two successive products $a_i \cdot b_i$ and $a_{i+1} \cdot b_{i+1}$ and adds them to the previous result stored in register r1.

According to an embodiment, the FFDMDAW instruction may be associated with an additional parameter, for example defined by a suffix which can take the following values: ".NP", ".PN" and ".NN", and specifying whether the sign of the first product (r2·r4) or of the second product (r3·r5) should be inverted in the calculation r1=r1+r2·r4+r3·r5 performed by the FFDMDAW operator. Thus:

$$FFDMDAW.NP \; \$r1 = \$r2r3, \$r4r5$$

performs the operation $r1=r1-r2 \cdot r4+r3 \cdot r5$ $$FFDMDAW.PN \; \$r1 = \$r2r3, \$r4r5$$

performs the operation $r1=r1+r2 \cdot r4-r3 \cdot r5$, and $$FFDMDAW.NN \; \$r1 = \$r2r3, \$r4r5$$

performs the operation $r1=r1-r2 \cdot r4-r3 \cdot r5$.

According to an embodiment, the FFDMDAW instruction may be associated with an additional parameter, defined for example by a suffix ".X" to specify that the two values in the second pair of registers should be exchanged before executing the calculation.

Thus, $FFDMDAW.X \; \$r1=\$r2r3,\$r4r5$ performs the operation $r1=r1+r2 \cdot r5+r3 \cdot r4$.

The combination of sign reversal and exchange parameters may be useful, for example, to calculate the product of complex numbers $z_1=a+b \cdot i$ and $z_2=c+d \cdot i$ (with $i^2=-1$). Thus, the product $z_1 \cdot z_2 = a \cdot c - b \cdot d + i(a \cdot d + b \cdot c)$ can be obtained by the following instructions:

| | |
|---|---|
| LW $r0 = 0 | # initialize register r0 to 0 |
| LW $r1 = 0 | # initialize register r1 to 0 |
| LW $r2 = a | # load a into register r2 |
| LW $r3 = b | # load b into register r3 |
| LW $r4 = c | # load c into register r4 |
| LW $r5 = d | # load d into register r5 |
| FFDMDAW.PN $r0 = $r2r3, $r4r5 | # r0 = r2 · r4 − r3 · r5 = a · c − b · d |
| FFDMDAW.X $r1 = $r2r3, $r4r5 | # r1 = r2 · r5 + r3 · r4 = a · d + b · c, | the registers r0, r1 receiving respectively the real part (a·c−b·d) and the imaginary part (a·d+b·c) of the product of the complex numbers $z_1$, $z_2$.

Similarly, it is possible to calculate the product of a complex number by the conjugate of another complex number:

$$z_1 \bar{z}_2 = (a+i \cdot b)(c-i \cdot d) = (a \cdot c+b \cdot d)+i(b \cdot c-a \cdot d) \qquad (6)$$

The product $z_1 \cdot \overline{z}_2$ can be obtained by the following two instructions:

```
FFDMDAW $r0 = $r2r3, $r4r5      # r0 = r2 · r4 + r3 · r5 = a · c + b · d,
and
FFDMDAW.NP.X $r1 = $r2r3, $r4r5 # r1 = −r2 · r5 + r3 · r4 = −a · d + b · c.
```

It can be observed that these instructions allow the registers receiving the real and imaginary parts of the product to be individually specified. If the processor core allows it, especially in the case of a processor core with SIMD instructions, it is thus possible to calculate the dot-product of vectors of complex numbers in a single operation or in parallel, the real and imaginary parts of the product being obtainable in respective vectors designated in the instruction.

It should also be noted that the multiplicand pairs (a1, b1), (a2, b2) can be designated in the FFDMDAW instruction in various other ways. For example, the instruction FFDMDAW $r1=$r2r3, $r4r5 may designate the operation r1=r2·r3+r4·r5+r1. In this case, the ".X" parameter is used to swap registers r3 and r5.

According to an embodiment, the FFDMDAW instruction includes a fourth register reference to designate two distinct registers containing respectively the addition operand c and the result of the operation. Thus, for example, an instruction designating the FDMDA operator may be formulated as follows:

$$FFDMDAW\ \$r0=\$r2r3,\$r4r5,\$r1\#r0=r2\cdot r4+r3\cdot r5+r1.$$

According to another embodiment, the FFDMDAW register references designating the multiplicands of the instruction each designate a group of N consecutive registers of a processor core register file. For hardware reasons, N may be limited to a power of 2 ($N=2^n$, with $n=1, 2, 3, \ldots$). Thus, for example, an instruction designating an FNMNA operator with N=4 can be formulated as follows:

$$FFNMNAW\ \$r1=\$r4r5r6r7,\$r8r9r10r11$$

$$\#r1=r1+r4\cdot r8+r5\cdot r9+r6r\cdot 10+r7\cdot r11,$$

or $$FFNMNAW\ \$r1=\$r4,\$r8$$

$$\#r1=r1+r4\cdot r8+r5\cdot r9+r6\cdot r10+r7\cdot r11.$$

Relations (2) and (3) may be generalized and adapted to cases where the FFNMNAW instruction can perform four or more multiplications and add all products obtained with the addition operand. Thus, the polynomial to be evaluated can be decomposed into polynomials of degree 4 or more depending on the number of multiplicand pairs specified in the FFNMNAW instruction. In this case, the ".X" parameter may be used in the FFNMNAW instruction to specify that the registers of each pair of registers in one of the two designated groups of N registers are to be swapped. In addition, the instruction may be associated with a ".N"/".P" parameter for each of the registers in one of the two designated groups of N registers.

More generally, the FFDMDAW (or FFNMNAW) instruction can be extended to a SIMD instruction to work simultaneously on sets of operands each comprising Q elements, to evaluate simultaneously Q FDMDA (or FFNMNAW) operations. For example, in the instruction FFDMDAWQ $r0=$r2r3, $r4r5, the registers ri (i=1, 2, . . . 5) each comprise Q=4 operands ri[j], j=1, 2, 3, 4, and the instruction is executed by performing the four operations:

$$r0[j]=r2[j]\cdot r4[j]+r3[j]\cdot r5[j],\ \text{with}\ j=1,2,3,4.$$

Thus, the registers designated in the FFDMDAWQ instruction are four times larger than the registers designated in the FFDMDAW instruction.

Figure 2:
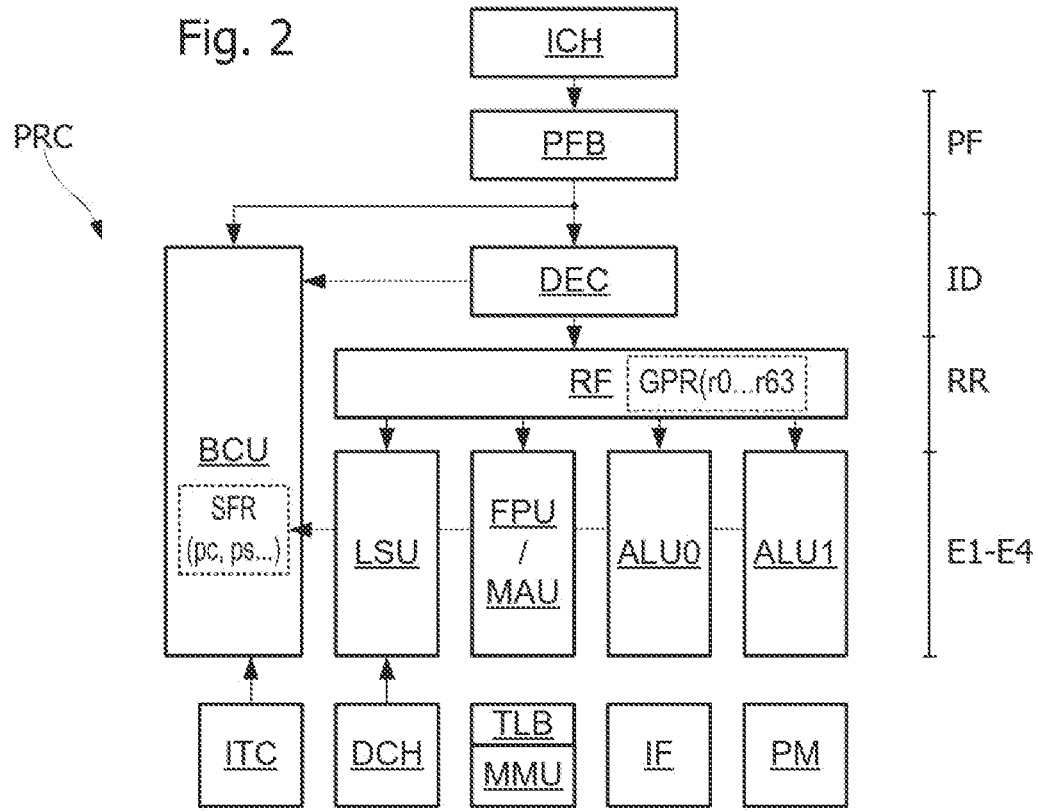
FIG. 2 illustrates an example of a processor core architecture that can serve as a basis for the disclosure.

FIG. 2 illustrates an example of a processor core PRC that may have the FFDMDAW instruction in its instruction set. The processor core has a pipeline with a depth of 7 stages, including an instruction pre-fetch stage PF, an instruction decode stage ID, a register read stage RR, and four instruction execution stages E1 to E4.

The PF stage essentially comprises a buffer PFB storing the preloaded instructions, fed from an instruction cache ICH. The ID stage comprises an instruction decoding unit DEC which controls a register file RF forming the stage RR. The decoding unit is configured to decode FFDMDAW instructions. The register bank RF manages General Purpose Registers GPR, in this example 64 registers r0 to r63 of 64 bits. The selected registers are read or written, depending on the decoded instruction, to one of several parallel processing units forming the execution stages E1 to E4. These processing units may include a Load/Store Unit LSU accessing a data cache DCH, a Floating-Point Unit FPU, a branch and compare unit BCU connected and configured to process the instructions dedicated to it upon input from the decoder DEC, one or more arithmetic and logic units ALU0, ALU1, and a multiplication unit MAU which may include one or more operators of type FNMNA ($N=2^n$). The MAU may be merged with the FPU.

The processor core has a VLIW (Very Large Instruction Word) architecture. As a result, the decode unit DEC processes packets that may contain multiple instructions to be executed simultaneously—here the core can execute up to five instructions simultaneously, one on each processing unit of the E1-E4 execution stages, and one in a BCU unit described below.

The BCU unit is designed to support branch management and includes a set of system function registers SFR, including a program counter PC, configured to hold the address of the currently executed instruction (or the address of the first instruction in a VLIW packet), and a processor core status register PS, which defines, among other things, a privilege ring in which the current instruction is executed, associated permissions, and masked exceptions. Stores SPC and SPS are also provided for saving the program counter and the processor core status register.

The processor core also includes various peripheral units, including an interrupt controller ITC that generates interrupts to the BCU based on external events, a memory management unit MMU associated with an address translation table TLB, input/output interfaces IF, performance monitors PM, cache memories DCH, etc.

Figure 3:
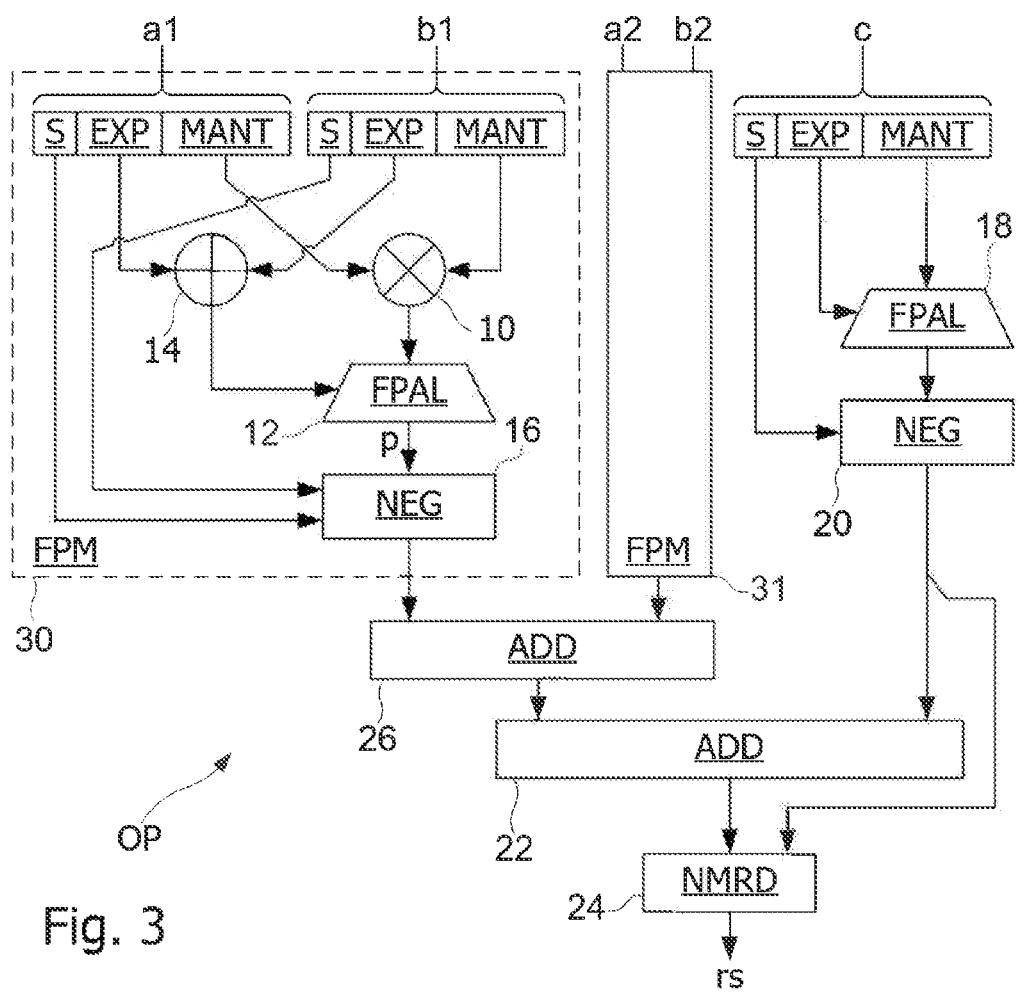
FIG. 3 is a schematic diagram of an example of a fused double multiplication and double addition operator.

FIG. 3 represents an exemplary operator OP of mixed precision structure FDMDA (fp16/fp32). Some elements conventionally required to deal with the specifics of standardized floating-point numbers, such as subnormal numbers, undefined numbers (NaN), infinity, and others, are not described.

The operator OP comprises several floating-point multiplication units FPM 30, 31, each providing a fixed-point result. Each FPM unit receives a pair of multiplicands (a1, b1), (a2, b2), for example in the format fp16 (or binary 16) or fp31 (or binary 32). Each of the multiplicands comprises a sign bit S, an exponent EXP, and a mantissa MANT. The two mantissas are provided to a multiplier 10 which calculates a product of the mantissas MANT as an integer. The mantissa product is supplied to an alignment circuit 12 that is controlled by an adder 14 producing the sum of the exponents EXP of the multiplicands a1 and b1 (or a2 and b2). The alignment circuit 12 is configured to perform a conversion of the mantissa product considering the sum of the exponents, to provide the product p of the multiplicands a1, b1 (or a2, b2) as a fixed-point number.

The output of the alignment circuit 12 is passed to a negation circuit 16 configured to invert the sign of the absolute value when the signs of the multiplicands are opposite. The number so produced by the negation circuit 16 forms the output of one of the multiplication units 30, 31. Each partial product a1·b1, a2·b2 is thus calculated by a respective multiplication unit 30, 31. The partial products are supplied to an adder 26.

Furthermore, an addition operand c provided to the operator OP, for example in fp32 (or binary32) format includes a sign bit S, an exponent EXP, and a mantissa MANT. The mantissa MANT is provided to an alignment circuit 18 that is controlled by the exponent of the operand c. The circuit 18 is configured to perform a conversion of the floating-point operand c to a fixed-point number.

The number provided by the alignment circuit 18 is passed through a negation circuit 20 controlled by the sign bit of the operand c. Alternatively, the negation circuit 20 can be omitted and, at the negation circuit 16, the sign of the product can be inverted if it is not equal to that of the operand c.

The fixed-point number thus provided by the adder 26 is to be added with the addition operand c, converted to fixed-point. Thus, the alignment circuit 18 performs a conversion to a fixed-point number, and the downstream processing is adapted accordingly. In particular, the high-order bits of the operand c are provided to an adder 22. On the sum of partial products side, the 80+o bits provided by the adder 26 are supplemented on the left and right with 24 fixed value bits (0 for a positive result or 1 for a negative result).

The adder 22 receives the output of the adder 26 and the high-order bits of the signed number provided by the negation circuit 20. The low order bits of the output of the negation circuit 20 are used downstream in a rounding calculation.

The output of the adder 22 is processed by a normalization and rounding circuit 24 which functions to convert the fixed-point result of the addition to a floating-point number rs in fp32 format. The multiplication units 30, 31 and the adders 22, 26 may be sized to perform lossless or rounded calculations. In addition, the rounding performed by the circuit 24 can be calculated correctly.

Thus, the operator OP structure of FIG. 3 performs only one rounding, when converting the final addition result to a floating-point number, and this single rounding can be computed correctly under all circumstances.

Of course, the number of multiplication units FPM may be extended beyond two to execute FFNMNAW instructions with more than two pairs of multiplicands. Indeed, it can be observed that the multiplication units FPM are independent of each other, as it is not necessary to compare the exponents of the partial products to perform a relative alignment of the mantissas of the partial products. Each FPM unit converts to the same fixed-point format common to all numbers. As a result, it is particularly easy in design to vary the number of multiplication units FPM as needed, since there are no interdependencies between the multiplication units. Adapting the structure of the multi-adder 26 as a function of the number of operands is also easy, as it is done according to systematic rules. The complexity of the operator can thus be kept proportional to the number of multiplication units.

Figure 4:
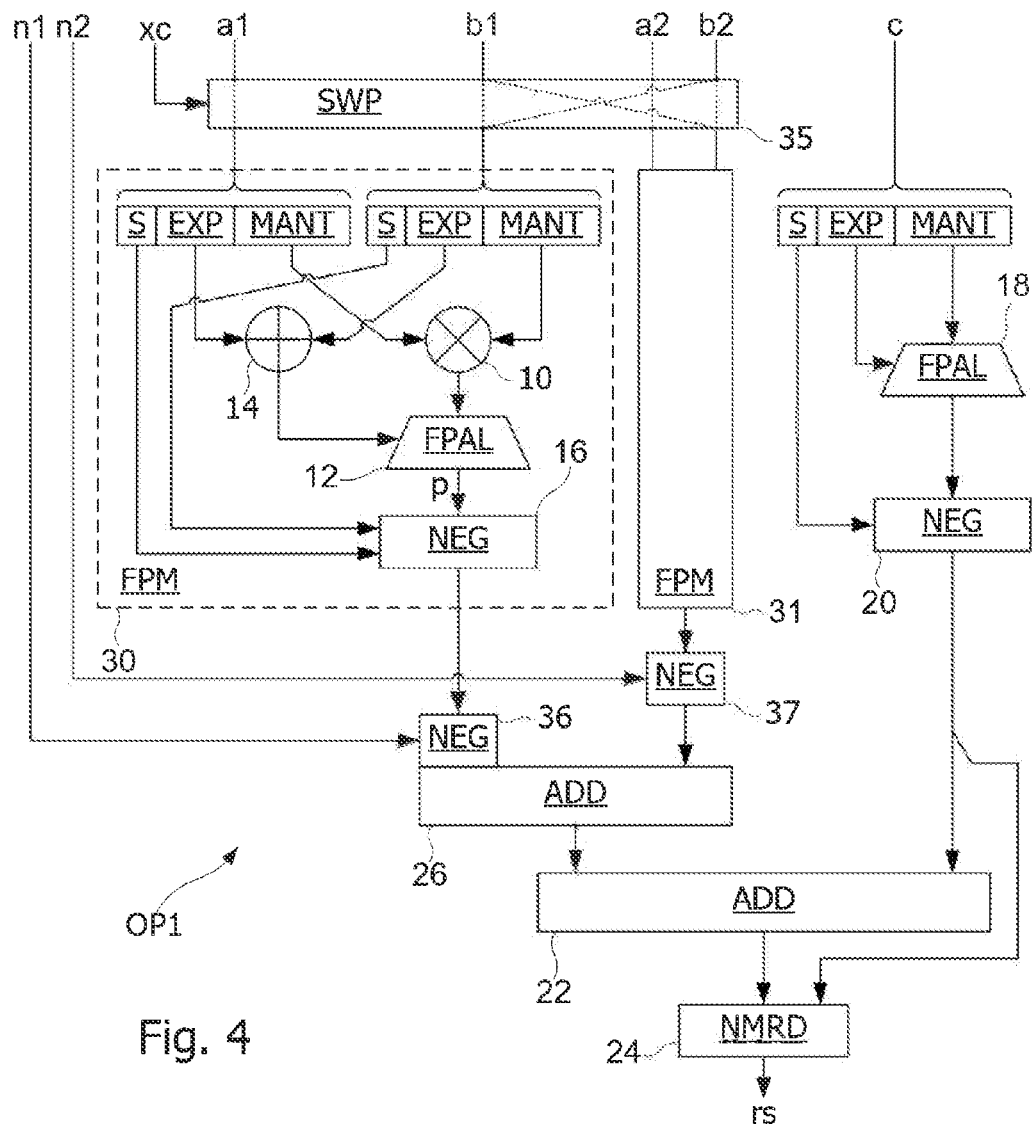
FIG. 4 is a schematic diagram of another example of a fused double multiplication and double addition operator.

According to an embodiment illustrated in FIG. 4, the FDMDA operator OP1 further comprises an inverter circuit 35 receiving the operands b1, b2, for exchanging these operands according to a control signal xc. Thus, in a given state of the signal xc, the operand b1 is supplied to the multiplying unit 31 instead of the unit 30 and the operand b2 is supplied to the multiplying unit 30 instead of the unit 31. The state of the signal xc can be controlled by the instruction decoder DEC depending on the presence of the parameter ".X" in the FFDMDAW instruction.

The operator OP1 further comprises two negation circuits 36, 37 controlled respectively by two signals n1, n2 to invert the sign, respectively of the product at the output of the multiplication unit 30 and of the product at the output of the multiplication unit 31, before being added together in the adder 26. The state of the signals n1, n2 is defined according to the presence of any of the parameters ".NP", ".PN", ".NN", associated with the instruction FFDMDAW.

It will be apparent to those skilled in the art that the present disclosure is susceptible of various alternatives and applications. In particular, the operators illustrated in FIGS. 3 and 4 have been described as combinational logic circuits. In a processor core clocked at a relatively fast frequency, the reaction time of a combinational logic circuit may be too slow. In this case the operators may have a pipelined structure, by providing registers for storing intermediate results, for example, storing the output numbers of the alignment circuits 12 and 18 and/or the circuits 30, 31 and 20. The operators described with reference to FIGS. 3 and 4 may easily be adapted to other precision formats whether standardized or non-standardized.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method of processing data by a processor, the method comprising the steps of:
   receiving, by the processor, an instruction including an operator code associated with three register references designating registers configured to contain pairs of multiplication operands, an addition operand, and a result register configured to receive an operator result, the operator code designating an operator configured to compute products of the pairs of multiplication operands and add the products with the addition operand;
   decoding the instruction by an instruction decoder of the processor, to determine the operator to be executed, and the registers containing the operands to be supplied to the operator and the result of the operator;
   actuating the operator by an arithmetic circuit of the processor, consuming the operands in the registers designated by the register references; and
   storing the result of the operator in the designated result register.

2. The method of claim 1, wherein the register references include two register references respectively designating:

two pairs of consecutive registers of a register bank, configured to contain the multiplication operands, or two groups of N consecutive registers of the register bank, configured to contain the multiplication operands, wherein the operator is configured to calculate N products from N pairs of registers by associating a register of one of the two groups with a respective register of the other of the two groups.

3. The method of claim 1, wherein the register references include:

a register reference designating a same register configured to contain the addition operand and to receive the result provided by the operator, or a register reference designating two consecutive registers of the register bank, configured respectively to contain the addition operand and to receive the result provided by the operator, or a register reference designating a register configured to contain the addition operand, and a register reference designating a register configured to receive the result provided by the operator.

4. The method of claim 1, wherein the products are calculated simultaneously, and the additions are performed simultaneously.

5. The method of claim 1, wherein the register references designate multiple sets of operands, and each designated register includes one operand of each set of operands, the operator being executed on each set of operands simultaneously, the designated result register containing the results of the operator consuming the sets of operands.

6. The method of claim 1, comprising the steps of:

receiving by the processor a series of instructions for evaluating a polynomial, wherein instructions of the series of instructions designate the operator and five operands, each instruction being configured to evaluate two terms involving a variable of a second degree polynomial, resulting from a decomposition of the polynomial to be evaluated, and calculating the sum of the two terms with a third term of the second degree polynomial;

designating the result register of an instruction of the series of instructions in a subsequent instruction of the series of instructions as a product operand register to be multiplied by the square of the variable, and successively executing by the processor the instructions of the series of instructions to calculate a value of the polynomial to be evaluated involving the variable.

7. The method of claim 6, wherein the polynomial to be evaluated is previously decomposed into two polynomials grouping the terms containing the variable raised to an even power and, respectively, the terms containing the variable raised to an odd power, the series of instructions including two series of instructions for evaluating the two polynomials respectively.

8. The method of claim 1, comprising the steps of:

receiving by the processor a series of instructions for evaluating a dot-product of two vectors, the series of instructions including instructions designating the operator configured to each compute two terms of the product and add them to a result obtained by executing a preceding instruction of the series of instructions designating the operator, and executing successively by the processor the instructions of the series of instructions.

9. The method of claim 1, wherein the instruction includes a parameter selectively indicating that the sign of each of the products is to be inverted before calculating the sum.

10. The method of claim 1, wherein the instruction includes a parameter selectively indicating that the registers designated by one of the register references designating multiplication operands are to be swapped by pairs prior to calculation of the products.

11. The method of claim 1, comprising the steps of:

receiving by the processor a series of instructions for evaluating the product of two complex numbers, the series of instructions including two instructions designating the operator and register pairs containing the real and imaginary parts of the two complex numbers, respectively, one of the two instructions being configured to compute a real part of the product and the other of the two instructions being configured to compute an imaginary part of the product, and executing by the processor the instructions of the series of instructions.

12. The method of claim 1, wherein the operands are encoded in one of the following formats:

single or double precision floating point, fixed point, integer, and number belonging to a Galois field.

13. The method according to claim 1, wherein the arithmetic calculation circuit of the processor is configured to calculate the products and the sum without loss of accuracy through rounding operations.

14. A processor comprising:

a fused multiplication and addition operator configured to receive an instruction including an operator code associated with three register references designating registers configured to contain pairs of multiplication operands, an addition operand, and a result register configured to receive an operator result, the operator code designating an operator configured to compute products of the pairs of multiplication operands and add the products with the addition operand;

an instruction decoder configured to decode the instruction, to determine the operator to be executed, and the registers containing the operands to be supplied to the operator and the result of the operator;

an arithmetic circuit configured to actuate the operator, consuming the operands in the registers designated by the register references; and a result register configured to store the result of the operator.

15. The processor of claim 14, comprising a plurality of processing units for actuating in parallel a plurality of operators computing the products and adding the products with the addition operand.

16. The processor of claim 14, comprising an operator including a plurality of multipliers, each calculating a product of pairs of operands, and an adder adding together the products to an addition operand.

* * * * *